L. SOULLIERE.
AUTOMOBILE LOCK.
APPLICATION FILED AUG. 7, 1916.
1,205,051. Patented Nov. 14, 1916.
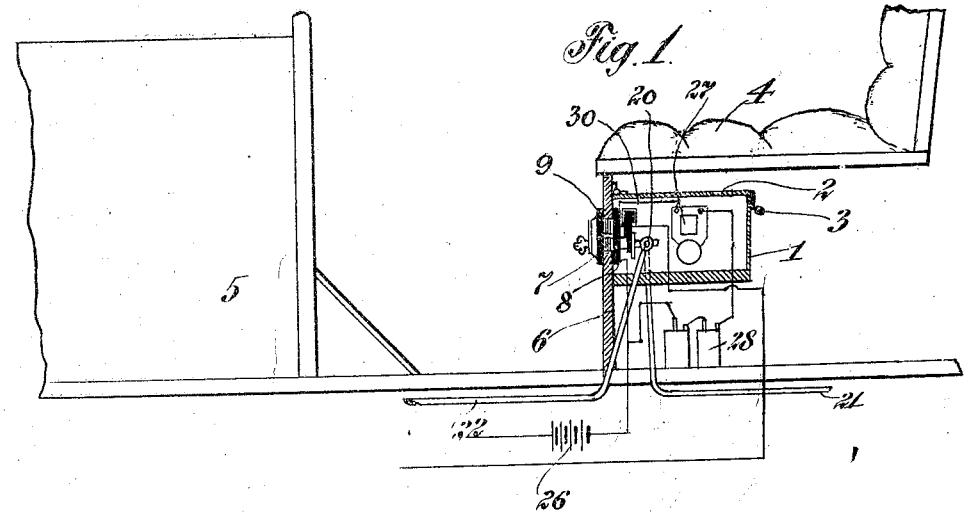
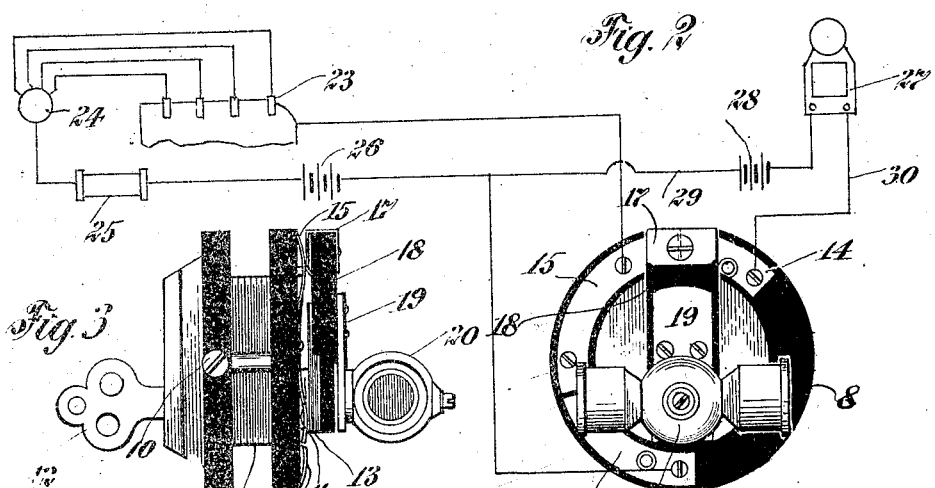
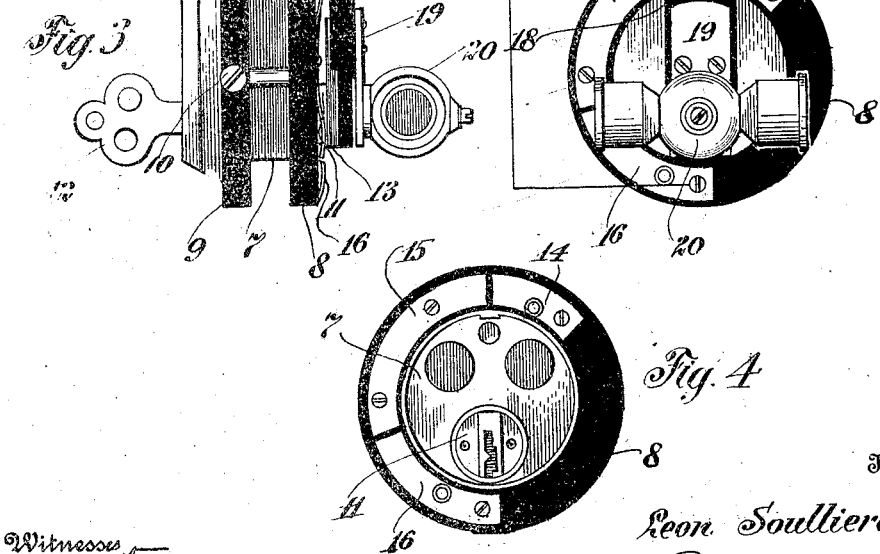
Witnesses
Charles Balg
Anna M. Dorr
Inventor
Leon Soulliere
By
Attorneys

UNITED STATES PATENT OFFICE.

LEON SOULLIERE, OF DETROIT, MICHIGAN.

AUTOMOBILE-LOCK.

1,205,051.     Specification of Letters Patent.     Patented Nov. 14, 1916.

Application filed August 7, 1916. Serial No. 113,558.

*To all whom it may concern:*

Be it known that I, LEON SOULLIERE, a citizen of the United States of America, residing at Detroit, in the county of Wayne and State of Michigan, have invented certain new and useful Improvements in Automobile-Locks, of which the following is a specification, reference being had therein to the accompanying drawings.

This invention relates to an automobile lock, and the primary object of my invention is to provide simple and effective means, in a manner as hereinafter set forth, for controlling the fuel supply of the automobile and the electric ignition system thereof, whereby either of these essential operating systems of an automobile cannot be surreptitiously used and the automobile stolen by using its own power.

A further object of my invention is to combine an electric switch and valve in such a manner that they may be actuated in synchronism by the barrel and key of a lock, and associated with the electric switch and the ignition system is an electric alarm adapted to produce an audible signal when the wiring system of the automobile is tampered with or connections made with a view of completing an operative ignition system.

The above objects are attained by electrical devices compactly assembled and securely held with the lock in juxtaposition to the chauffeur's seat of an automobile.

The mechanical construction entering into my invention will be hereinafter described and then particularly pointed out in the claims, and reference will be had to the drawings, wherein—

Figure 1 is a side elevation of a portion of an automobile, partly in section, showing the automobile lock; Fig. 2 is a rear elevation of the lock and valve, showing the valve closed and the switch of the lock in circuit with an ignition system and audible signal; Fig. 3 is a side elevation of the lock, switch and valve, and Fig. 4 is a rear elevation of the lock and switch.

In the drawings, 1 denotes a box or casing having a hinge lid or closure 2 that is held normally closed by an ordinary lock or seal 3. The box or casing is located beneath the chauffeur's seat 4 of an automobile 5, and said box or casing has for one of its walls the heel board 6 of the automobile. This heel board has an opening to accommodate the body 7 of a lock, said body having a fixed head 8 of insulation material and a detachable head 9 of insulation material, said detachable head permitting of the lock body being mounted in the opening of the heel board 6. The detachable head 9 is fixed relative to the body 7, after the lock is in position, by a screw 10 or other fastening means. In the lock body 7 and extending longitudinally thereof is a barrel 11 adapted to be rotated or actuated by a key 12. The rear or inner end of the barrel 11 has a crank 13 and the elements 11, 12 and 13 are of a conventional form common to key operated locks.

The fixed lock head 8 of insulation material is provided with segment contact pieces 14, 15, and 16, and the contact pieces 14 and 15 or 15 and 16 are adapted to be bridged or connected by a contact member 17, carried by an arm 18 of insulation suitably connected to the crank 13 of the lock barrel 11. The arm 18 is also connected to the operating crank or handle 19 of a valve 20, said valve being of the ordinary plug type adapted to control the supply or flow of a liquid or gas. The valve 20 is necessarily within the box or casing 1 in proximity to the lock body 7, and extending into the box 1 is a fuel supply pipe 21 which is connected to one end of the valve. The opposite end of the valve has a pipe 22 extending out of the box 1 and forwardly to the power plant of the automobile. The pipes 21 and 22 with the valve 20 constitute part of the fuel supply system of an automobile using gasolene or a similar fuel in connection with the engine or power plant of the automobile.

Contact pieces 15 and 16 of the lock switch are in circuit with the ignition system of the automobile, such system ordinarily including engine spark plugs 23, a timer 24, a spark coil 25, and a suitable source of electrical energy 26, these devices being electrically connected with the contact pieces 15 and 16 so that when said contact pieces are connected or bridged by the member 17 an electrical circuit is established in connection with the ignition system.

In the box or casing 1 is mounted an audible signal, as an electric bell 27 and this bell has a source of electrical energy 28 which is connected by a wire 29 to one of the wires of the ignition system, while said bell is connected by another wire 30 to the contact piece 14 of the lock switch.

As shown in Fig. 2, the valve 20 is closed, and the contact member 17 bridges or connects the contact pieces 14 and 15. The circuit of the ignition system is open and should an unauthorized attempt be made to complete the circuit by connecting wires adjacent the lock, an alarm circuit is immediately established and the sounding of the audible signal is calculated to attract attention and scare the person tampering with the automobile.

A person equipped with a proper key can easily open the valve 20 of the fuel supply system and simultaneously establish an ignition circuit whereby the automobile may be used.

The invention is not necessarily limited to the location of the lock and it is thought that the operation and utility of the same will be apparent without further description.

While in the drawing there is illustrated a preferred embodiment of my invention, it is to be understood that the structural elements are susceptible to such variations and modifications as fall within the scope of the appended claims.

What I claim is:—

1. An automobile lock comprising a switch having contact pieces adapted to be included in the circuit of an ignition system and an electric alarm, a valve controlling the fuel supply system of the automobile, and a key actuated arm connected to said valve to open and close the valve and engage said contact pieces and complete an ignition circuit and establish an open alarm circuit.

2. In an automobile, a fuel supply system, a valve in connection therewith, an ignition system, a switch therefor, a key actuated arm adapted to simultaneously operate said valve and establish an ignition circuit in connection with said switch, and an open alarm circuit in connection with said switch and said ignition system.

3. In an automobile having a fuel supply system and an ignition system, a normally closed and locked box having for one of its walls the heel board of the automobile, a key operated lock extending through the heel board of the automobile into said box, a switch forming part of said lock to control the ignition system of the automobile, a valve in said box to control the fuel supply system of the automobile, an arm actuated by said lock to operate said valve and establish an ignition circuit in connection with said switch, and an electrically operated audible signal in said box having a normally open circuit with said switch and the circuit of said ignition system.

4. The combination with the fuel supply system and electric ignition system of an automobile, of a normally closed and locked box, a lock carried thereby, contact pieces carried by said lock in the circuit of the ignition system of the automobile, an electrically operated signal in said box having one leg of the circuit thereof connected to be included in a portion of the ignition system circuit, a contact piece carried by said lock and connected by said signal, a valve in said box controlling the fuel supply system, and an arm between said lock and said valve and actuated by the former to operate the latter and also control the ignition system circuit.

In testimony whereof I affix my signature in the presence of two witnesses.

LEON SOULLIERE.

Witnesses:
ANNA M. DORR,
LEWIS E. FLANDERS.